Aug. 22, 1967  H. E. McCORMICK  3,336,913
VALVE STEM SEAL
Filed Oct. 23, 1965
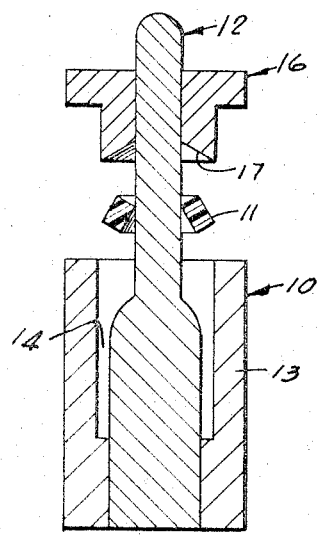
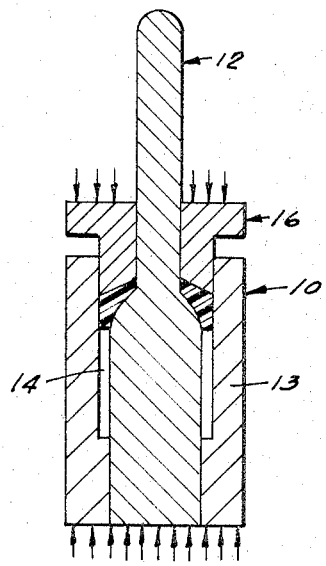
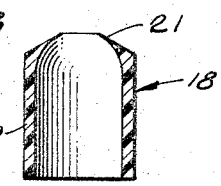
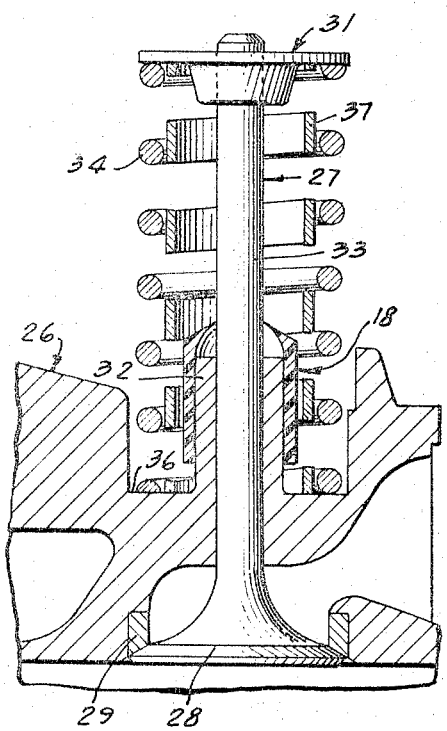
INVENTOR.
HAROLD E. McCORMICK
BY *Hill, Sherman, Meroni, Gross & Simpson* ATTORNEYS

# United States Patent Office 3,336,913
Patented Aug. 22, 1967

3,336,913
VALVE STEM SEAL
Harold E. McCormick, Ballwin, Mo., assignor to Ramsey Corporation, St. Louis, Mo., a corporation of Ohio
Filed Oct. 23, 1965, Ser. No. 503,131
6 Claims. (Cl. 123—188)

The present invention relates to a method for providing a seal in a valve guide and valve stem assembly of the type employed in internal combustion engines. The invention also relates to a new seal structure produced by this method.

Internal combustion engines which use valves having stems arranged for reciprocation in valve guides may evidence high rates of use of lubricating oil due to leakage of oil between the guide and the stem and into the combustion chamber. The provision of a suitable seal between the valve stem and the guide is hampered, among other things, by the small clearance available in the area. Modern high speed, high compression engines using damper springs are particularly troublesome in this respect, as the clearance between the damper spring and the valve guide may be as low as 0.015 to 0.030 inch.

One prior attempt to provide a seal between the reciprocating valve stem and the valve guide made use of a mechanical locking of a sealing element in conjunction with a machined recess in the valve guide to hold the valve stem seal in position. A second device made use of a spring and special cap assembly between the valve guide and the conventional valve cap and keeper assembly to hold a sealing element about the reciprocating valve stem. Both of these devices were costly due to the relatively large number of parts required, and in some cases, because of the special machining operations required.

The present invention provides an improved seal element particularly adapted for use in environments where lack of space is a problem, the seal element consisting of a single piece of a molded resin completely suitable for use with various configurations of valve guides.

One of the objects of the present invention is to provide an improved method for the production of a seal which does not require special machining or a large multiplicity of parts.

Still another object of the invention is to provide an improved method for incorporating a seal in a valve stem-valve guide assembly in which only limited space is available.

Still another object of the invention is to provide an improved method for applying a seal to a valve guide for wiping contact with the valve stem.

Still another object of the invention is to provide an improved seal assembly for a valve stem and valve guide assembly which automatically adjusts to irregularities in contour of the assembly during the formation of the seal element.

In accordance with the present invention, I provide a seal for a valve stem or the like composed of a resinous material having the property of elastic memory, that is, the property to return to an original molded shape by the application of heat after being distorted or distended from that shape by mechanical working. Fluorocarbon resins, particularly tetrafluoroethylene resins and fluorinated ethylene propylene (a copolymer of tetrafluoroethylene and hexafluoropropylene) have this inherent property. Tetrafluoroethylene resins can be molded and sintered at temperatures in excess of 621° F. to develop a strong memory. Fluorinated ethylene propylene can be molded at temperatures in excess of 520° F. to develop a strong memory. Forms or shapes given to the part at temperatures lower than 621° F. or 520° F. after the initial molding and sintering can be destroyed and the part will tend to reassume its original molded shape by application of heat at a temperature below the original molding and sintering temperature. I take advantage of this property in the present invention by providing a molded sleeve of the fluorocarbon resin, then mechanically distending the sleeve into relatively loose fitting relationship over the valve guide and valve stem, followed by heating the assembly so that the sleeve, by virtue of its elastic memory, contracts and tightly engages the stem guide and provides wiping contact with the valve stem.

A further description of the present invention will be made in conjunction with the attached sheet of drawings which illustrates a preferred embodiment of the invention.

In the drawings:

FIGURE 1 is a somewhat schematic view of a molding assembly for shaping a fluorocarbon resin according to the present invention;

FIGURE 2 is a view similar to FIGURE 1 but illustrating the position of the elements during the application of pressure to the blank being molded, and before complete filling of the molding cavity;

FIGURE 3 is a cross-sectional view of the molded sleeve produced by the molding operation;

FIGURE 4 is a cross-sectional view of the sleeve after it has been mechanically distended; and FIGURE 5 is a fragmentary view of a poppet valve assembly incorporating the improved sealing element of the present invention.

As shown in the drawings:

In FIGURE 1, reference numeral 10 indicates generally a molding assembly for shaping an annular blank 11 of a fluorocarbon resin having the property of elastic memory. The blank 11 is positioned about a core 12 which is received within a mold 13 in spaced relation to define a molding cavity 14 therebetween. A punch 16 having internally beveled surfaces 17 is slidably mounted on the core 12 to apply deforming pressure on the blank 11 as illustrated in FIGURE 2. When the punch 16 is moved down along the core 12, it pushes the blank 11 into the molding cavity 14. The mold is then heated to an elevated temperature such that the temperature of the blank 11 in the mold exceeds about 621° F. in the case of tetrafluoroethylene, or 520° F. in the case of fluorinated ethylene propylene. At this temperature, the fluorocarbon resin becomes a gel and flows, thereby filling the molding cavity 14 entirely. Then, the mold is cooled, the punch 16 retracted, and the finished sleeve 18 is then removed. As shown in FIGURE 3, the sleeve 18 consists of a cylindrical wall 19 of substantially uniform thickness, terminating in a radially inwardly and upwardly inclined stem engaging portion 21.

Next, the sleeve 18 is worked at a temperature less than the gel temperature to provide a distended sleeve illustrated at reference numeral 22 in FIGURE 4. The distended sleeve 22 has an enlarged base portion 23 and a neck portion 24. The distended sleeve is then placed over a valve and valve guide assembly, as shown in FIGURE 5. In that figure, reference numeral 26 indicates generally an engine block in which a typical poppet valve 27 is arranged to reciprocate. The valve 27 has a seating face 28 arranged to be bottomed against a valve seat insert ring 29 composed of a corrosion resistant material. At the opposite end, the valve carries a conventional valve cap and keeper assembly 31. Formed in the engine block 26 is a valve guide 32 in which the stem portion 33 of the valve is arranged to reciprocate. A valve spring 34 is positioned between the cap and keeper assembly 31 and the base of a bore 36 in the engine block 26. A damper spring 37 consisting of a helical ribbon is positioned between the valve spring 34 and the valve stem 27 and is likewise bottomed on the base of the bore 36.

The distended sleeve 22 is placed over the valve stem 33 and the valve stem guide 32. Heat is applied to the assembly, whereupon the distended sleeve 22 tends to return to its original molded shape as illustrated in FIGURE 3. The contraction of the sleeve mounted on the valve stem guide 32 creates an interference between the valve guide and the sleeve which holds the sleeve in position, with the tapered portion 21 of the sleeve in wiping engagement with the stem 33 of the valve 27, thereby providing an effective seal along the valve stem.

From the foregoing, it will be understood that the seal of the present invention provides a particularly effective seal for environments where very little space is available. The nature of the materials employed is such as to provide automatic compensation for irregularities of the surface being sealed.

It should be evident that various modifications can be made to the described embodiments without departing from the scope of the present invention.

I claim as my invention:

1. The method of providing a seal about a valve stem and valve guide assembly which comprises molding a fluorocarbon resin having elastic memory properties into the shape of a sleeve at a temperature above the gel temperature of said resin, stretching at least a portion of the resulting sleeve to a larger diameter than the diameter of the originally molded sleeve, placing the stretched sleeve loosely over a valve guide, and heating the resulting assembly sufficiently to cause said sleeve to shrink into tightly fitting engagement about said valve guide by virtue of its elastic memory.

2. The method of claim 1 in which said fluorocarbon resin is a tetrafluoroethylene resin.

3. The method of claim 1 in which said fluorocarbon resin is a fluorinated ethylene propylene resin.

4. A valve assembly comprising a valve guide, a poppet valve having a stem arranged for reciprocation within said valve guide, and a seal snugly engaging said valve guide and said stem, said seal being provided by the method of claim 3.

5. The valve assembly of claim 4 in which said resinous material is a tetrafluoroethylene resin.

6. The valve assembly of claim 4 in which said resinous material is a fluorinated ethylene propylene resin.

References Cited

UNITED STATES PATENTS

| | | | |
|---|---|---|---|
| 2,821,155 | 1/1958 | Seckel | 264—230 X |
| 2,860,615 | 11/1958 | Mayes | 123—188 |
| 3,198,188 | 8/1965 | Heid | 123—188 |
| 3,243,211 | 3/1966 | Wetmore | 264—230 X |

MARK NEWMAN, *Primary Examiner.*

AL LAWRENCE SMITH, *Examiner.*